United States Patent [19]

Hasenauer et al.

[11] Patent Number: 4,576,881
[45] Date of Patent: Mar. 18, 1986

[54] ELECTROCHEMICAL STORAGE CELL

[75] Inventors: Dieter Hasenauer, Weinheim; Kuno Hug, Heidelberg, both of Fed. Rep. of Germany

[73] Assignee: Brown, Boveri & Cie AG, Mannheim, Fed. Rep. of Germany

[21] Appl. No.: 667,872

[22] Filed: Nov. 2, 1984

[30] Foreign Application Priority Data

Nov. 8, 1983 [DE] Fed. Rep. of Germany ....... 3340264

[51] Int. Cl.$^4$ ........................................... H01M 10/39
[52] U.S. Cl. ..................................... 429/104; 429/168
[58] Field of Search ......................... 429/104, 167, 168

[56] References Cited

U.S. PATENT DOCUMENTS

| | | | |
|---|---|---|---|
| 3,318,737 | 5/1967 | Watanabe et al. | 429/167 |
| 4,048,394 | 9/1977 | Ludwig | 429/104 |
| 4,160,069 | 7/1979 | Johnson et al. | 429/104 |
| 4,209,573 | 6/1980 | Chatterji et al. | 429/104 |
| 4,215,466 | 8/1980 | Bindin | 429/104 |
| 4,219,128 | 8/1980 | Breiter et al. | 429/104 |
| 4,401,731 | 8/1983 | Steinleitner | 429/104 |

Primary Examiner—Donald L. Walton
Attorney, Agent, or Firm—Herbert L. Lerner; Laurence A. Greenberg

[57] ABSTRACT

Electrochemical storage cell with at least one anode space and a cathode space separated from each other by an alkali-ion-conducting solid electrolyte and bounded at least in some areas by a housing. The housing is bounded on its inside by an inner housing element and on its outside by an outer housing element. The inner housing element acts as the current collector and embraces the two reactant spaces. The outer housing element assumes a support function and is arranged on all sides around the inner housing element in the manner of an enclosure. Preferably, the outer housing element is a tubular enclosure with two discs forming the end faces of the storage cell. The inner housing element is preferably made of aluminum and is provided with corrosion protection. The outer housing element can be made of a heat-resistant steel or an organic or inorganic material.

8 Claims, 4 Drawing Figures

ELECTROCHEMICAL STORAGE CELL

BACKGROUND OF THE INVENTION

1. Field of the Invention

The invention relates to an electrochemical storage cell based on alkali metal and sulfur with at least one anode space and a cathode space which are separated from each other by an alkali ion-conducting solid electrolyte and are bounded at least in some areas by a housing and are provided with at least one anodic terminal element and a cathodic terminal element.

2. Description of the Prior Art

Such rechargeable electrochemical storage cells of the above type are used in high-temperature storage batteries which find use, for instance, as energy sources for electric motors.

Electrochemical storage cells of the alkali metal and chalcogen type which comprise an anode space and a cathode space which are separated from each other by an alkali-ion-conducting solid electrolyte, are eminently suitable for the construction of storage batteries of high energy and power density. The storage cells are preferably cup-shaped, i.e., they are bounded on the outside by a cup-shaped metallic housing and have in the interior a solid electrolyte which is likewise cup-shaped.

The dimensions of the solid electrolyte are chosen to provide a coherent space between its outer surfaces and the inner surfaces of the metallic housing. There are two kinds of storage cells: the normal storage cell and the inverted storage cell. In the normal storage cell, the cathode space is arranged between the solid electrolyte and the metallic housing while the anode space is in the interior of the cup-shaped solid electrolyte. In the inverted storage cell, the reagent spaces are arranged exactly in the reverse. The housings of these storage cells are preferably made of aluminum or steel. A disadvantage here that in particular, aluminum is corroded rapidly by the sulfur in the cathode space or by the sodium polysulfide formed during the discharge of the storage cell. In the storage cells known thus far, the metallic housing serves not only for delineating the storage cell, but also as an electric conductor. The sulfur in the cathode space brings about the formation of aluminum sulfide on the inside surfaces of the housing. Aluminum sulfide is an electric non-conductor, by means of the current flow through the storage cell is severely reduced. A further disadvantage is that the strength of the aluminum is decreased materially at a temperature of 350° C.

If the housing is made of steel, its conductivity at a temperature of 350° C. is very low. In this case, the ohmic resistance of the housing is 30% of the total resistance of the storage cell. While the electric conductivity can be increased by increasing the wall thickness of the housing, the total weight of the cell is increased, whereby the energy of such a storage cell referred to the weight is markedly reduced.

SUMMARY OF THE INVENTION

It is therefore an object of the invention to provide a sodium sulfur storage cell which has a low total weight, a high energy content referred to weight and volume, as well as very large power as referred to weight and volume.

With the foregoing and other objects in view, there is provided in accordance with the invention an electrochemical storage cell based on alkai metal and sulfur with at least one anode space and a cathode space which are separated from each other by an alkali-ion-conducting solid electrolyte and are bounded at least in some areas by a housing, and are provided with at least one anodic terminal element and a cathodic terminal element, the improvement comprising a housing subdivided into at least two housing elements of which at least one inner metallic housing element is provided for electric conductance and an outer housing element for supporting the inner housing element.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

The invention will be explained in the following in greater detail with reference to the drawings.

Figure 1:
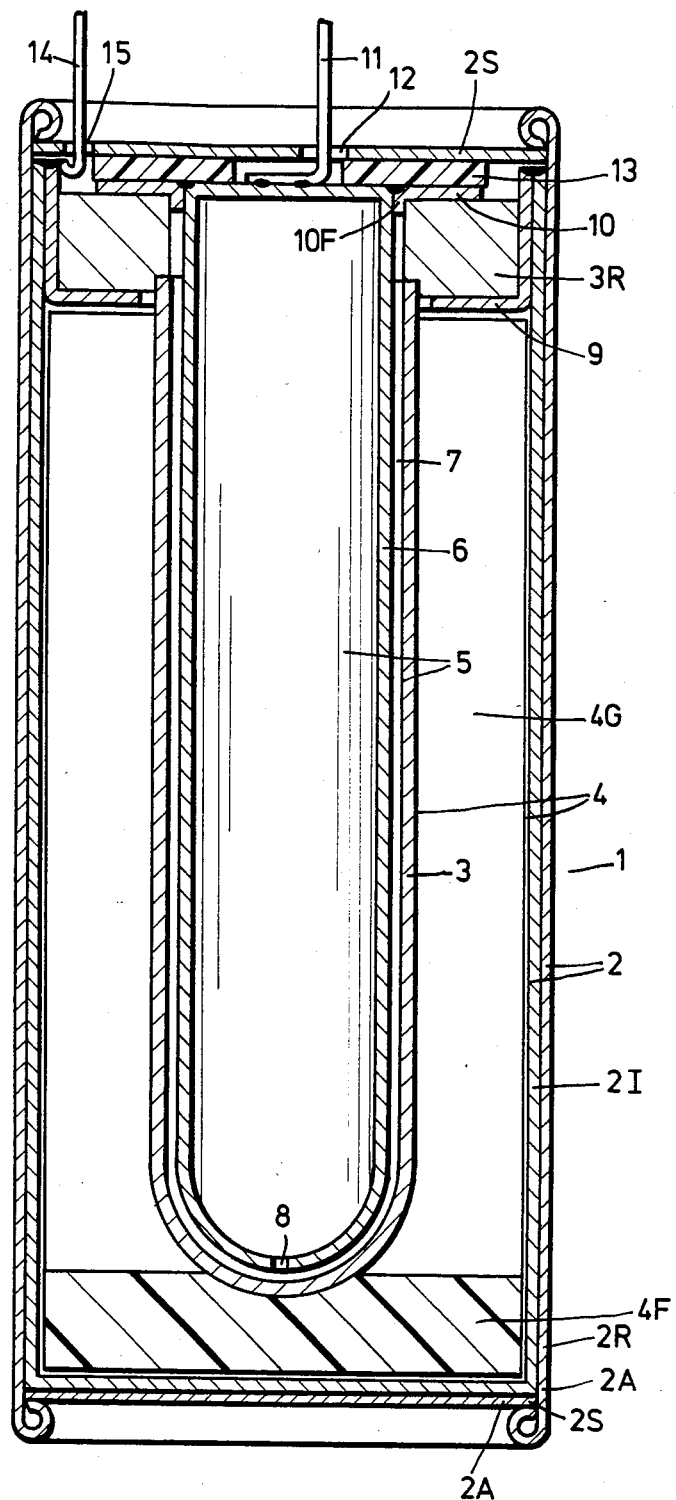
FIG. 1 shows a storage cell which is surrounded by two housing elements.

The storage cell shown in FIG. 1 includes as major structural units a metallic housing 2 made of two housing elements 2A and 2I as well as a solid electrolyte 3. The inner housing element 2I is cup-shaped and made of metal. Aluminum is preferably used for making the cup 2I. The inside surfaces of this housing element 2I are coated with corrosion protection (not shown here), to protect the housing against the action of the reagents, or the reaction substances. The outer housing element 2A is formed by a tube 2R having a thickness of between 0.3 and 0.5 cm which surrounds the inner housing element 2I like a jacket, with the tube 2R inside surfaces directly adjacent to the outer surfaces of the inner housing element 2I. The outer housing element 2A may be made of metal or an organic or inorganic material. Part of the outer housing element 2A are two discs 2S. One such disc 2S terminates the storage cell 1 at the one end face and another disc 2S at the other end face.

The solid electrolyte 3 is arranged in the interior of the storage cell. The former is likewise cup-shaped and is made of alkali ion-conducting ceramic, particularly beta-aluminum oxide. The solid electrolyte 3 is spaced from housing 2 to leave a coherent space 4 which serves as a reactant space between the outer surfaces of electrolyte 3 and the inside surfaces of the inner housing element 2I. In the embodiment example shown here, the space 4 is used as the cathode space. It is filled with a graphite felt 4G which is impregnated with sulfur (not shown here). A particularly flexible spacer 4F of graphite felt or ceramic felt is arranged which is impregnated with sulfur is placed between the lower end of the solid electrolyte 3 and the bottom of the inner housing element 2I. The solid electrolyte 3 is connected at its upper open end to an outward-extending insulating ring 3R which is made of nonconducting ceramic, particularly of alpha aluminum oxide. The connection between the solid electrolyte 3 and the insulating ring 3R is made by using glass solder (not shown here).

The interior of the solid electrolyte serves as the anode space 5. A safety container 6 made of metal, for instance, aluminum is arranged inside this anode space. The safety container 6 is also cup-shaped. Its dimensions are chosen to leave between its ouside surfaces and the inside surfaces of the solid electrolyte 3 a narrow safety gap 7 all around electrolyte 3. Gap 7 is filled with a material acting as a capillary (not shown here). The safety container 6 is completely filled with liquid sodium. It has only one opening 8 which is arranged in the lower region of the safety container 6 opposite the bottom of the solid electrolyte 3 and in particular, opposite its rounded dome. The sodium can leave the safety container through the opening 8 and get into the safety gap 7, where it is conducted under the action of the capillary material such that it wets the inside surfaces of the solid electrolyte everywhere.

According to the invention, the cathode space 4 is sealed vacuum-tight to the outside. To this end, the insulating ring 3R is surrounded on its underside and at its outward-directed boundary surface by a cup-shaped enclosure 9 of aluminum. The upper portion of the solid electrolyte 3 protrudes through the bottom of the enclosure 9. The connection between the insulating ring 3R and the enclosure 9 is made by the known thermo compression method. According to the invention, the dimensions of the insulating ring 3R are chosen so that, after connection to the enclosure 9, its outside surfaces are flush with the inner adjoining housing element 2I. The underside of the enclosure 9 terminates the cathode space 4 at the top. The upper edge of the enclosure 9 is joined to the inner housing element 2I of the housing 2. A washer 10 of aluminum is arranged on the surface of the insulating ring 3R. The washer 10 surrounds the upper edge of the safety container 6 and is connected firmly to the latter by vacuum welding. The washer 10 is additionally provided with a downward-pointing flange 10F which closes off vacuum-tight the area between the insulating ring 3R and the safety container 6, and in particular, the safety gap 7. The cathode space 4 and the anode space 5 are closed-off vacuum-tight to the outside by means of the enclosure 9 and the washer 10 as well as the additional connection of the enclosure 9 to the inner housing element 2I and the further connection of the washer 10 to the safety container. The upward-pointing end face of the safety container 6 is connected, in an electrically conducting manner, to an L-shaped terminal 11. The terminal is made, for instance, of a copper or aluminum alloy or of precipitation-hardened aluminum. One end of the electric anodic terminal 11 is brought through a hole in the disc 2S terminating the storage cell 1 at the top and protrudes several millimeters beyond the storage cell 1. At least that portion of the terminal 11 brought through the disc 2S is electrically insulated.

A washer 13 of an insulating elastic material is arranged between the disc 2S and the safety container 6 to prevent electrically conducting contact between the disc 2S and the part of the electric terminal 11 connected to the safety container. The disc 13 rests on the safety container 6 as well as on the washer 10 of aluminum.

The cathodic terminal 14 formed by a rod of aluminum which is brought through a hole 15 in the disc 2S extends outward beyond the storage cell 1 by a few millimeters. The second end of the terminal 14 arranged within the storage cell 1 is connected in an electrically conducting manner, preferably by welding, to the upper end of the enclosure 9 which extends beyond the insulating ring 3 and is welded to the inner housing element 2I. The cathodic terminal 14 is brought, electrically insulated, through the opening 15 in the disc 2S.

The two discs 2S which terminate the end faces of the storage cells 1 form a support, like the tube 2R which is likewise part of the outer housing element 2A, for the inner housing element 2I. The two discs 2S are retained by the tube 2R which is beaded over inward at both its ends.

Figure 2:
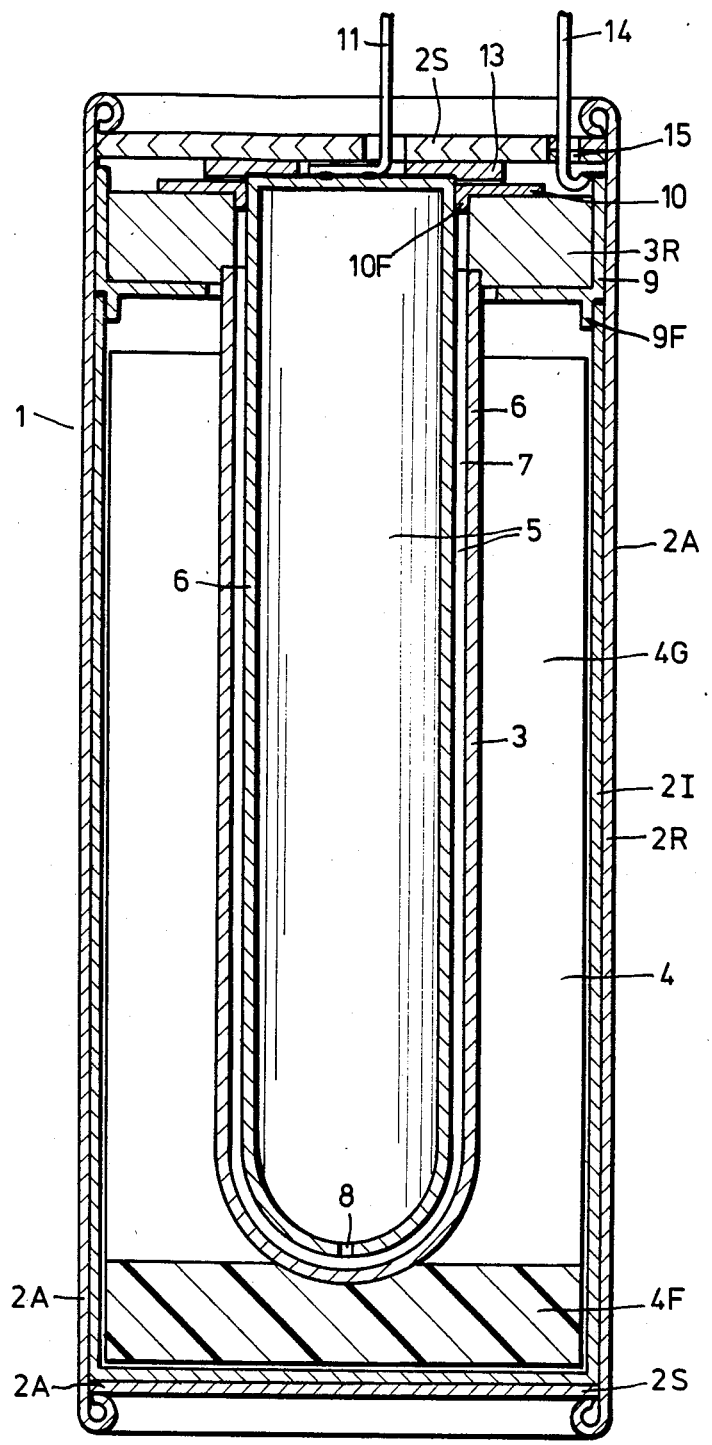
FIG. 2 is a variant of the storage cell shown in FIG. 1.

FIG. 2 shows a variant of the storage cell depicted in FIG. 1. The primary differences between the two storage cells relate only to the area of the closure. The other parts of this storage cell are designed as in the storage cell 1 shown in FIG. 1 and explained in the corresponding description. Corresponding parts are therefore provided with the same reference symbols.

In the storage cell shown in FIG. 2, the inner housing element 2I extends upward as shown in the drawing and ends below the insulating ring 3R which is connected to the solid electrolyte 3. The latter is surrounded in the embodiment example shown here by a cup-shaped enclosure 9 which completely covers its underside and its lateral boundary surface. The underside, of the enclosure 9 extends up to the solid electrolyte 3. Enclosure 9, in the vicinity of the inner housing element 2I, has a downward-pointing circular flange 9F which rests firmly against the inside of the inner housing element 2I. In addition, the enclosure 9 is welded in this region to the inner housing element 2I. The enclosure 9 is designed so that it extends upward beyond the insulating ring 3 by several millimeters. There, it is welded to a cathodic terminal element 14 which is brought through a hole 15 in the disc 2S and extends several millimeters beyond the storage cell 1. In order to prevent an electrically conducting connection of the disc 2S to the safety container 6, an elastic washer 13 of nonconductive material is again arranged between the disc 2S and the safety container 6. The washer 13 rests on the safety container 6 as well as on a washer 10 of aluminum which is arranged on the top side of the insulating ring 3. The washer 10 is connected, like the enclosure 9, to the insulating ring 3R, using the thermo-compression method. It borders directly on the safety container 6 and is welded to the latter. In addition, it has a flange 10F which protrudes into the safety gap 7 between the solid electrolyte 3 and the safety container 6 and closes off the latter from the outside. The anodic terminal element 11 is L-shaped and has one end welded to the surface of the safety container 6, while the other end is brought outside, insulated, through an opening 12 in the disc 2S and extends several millimeters beyond the storage cell 1.

Figure 3:
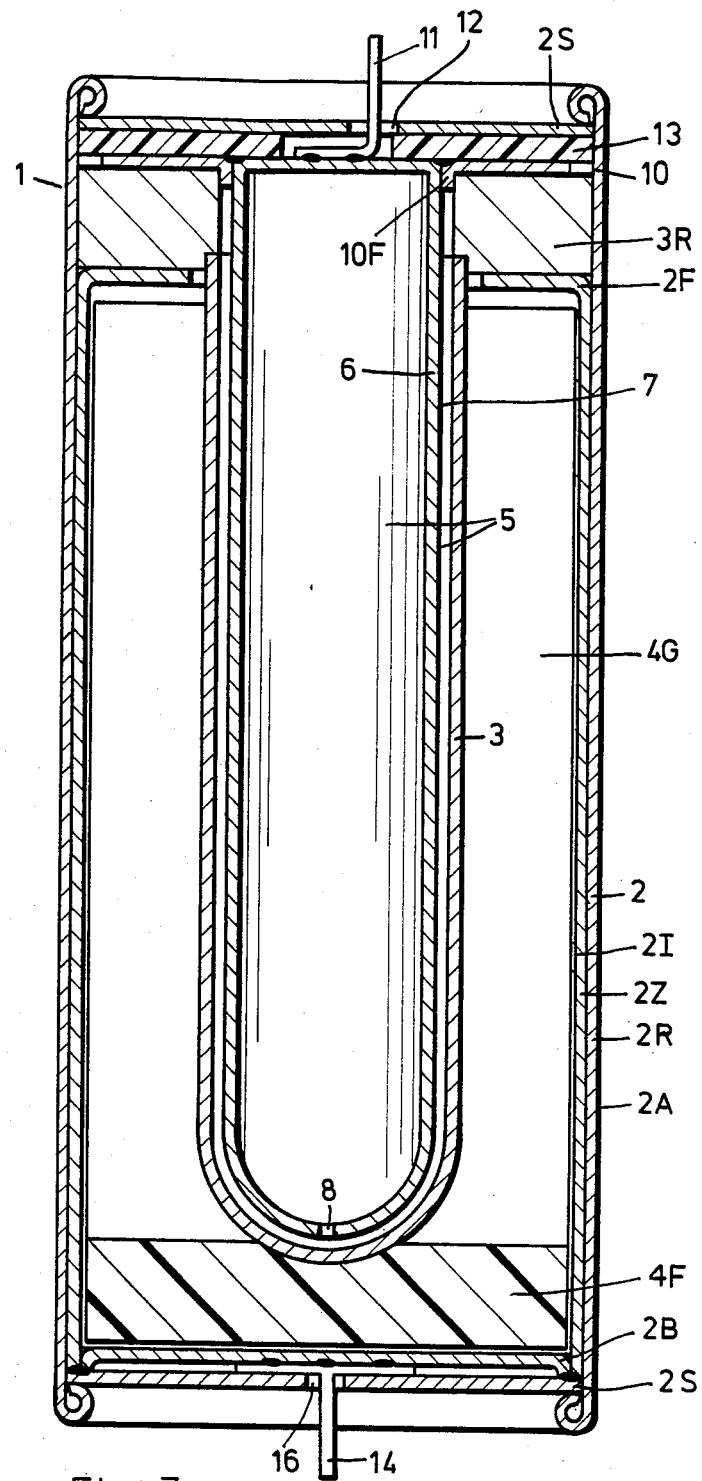
FIG. 3 is a storage cell with an electric terminal at an end face.

The storage cell 1 shown in FIG. 3 is bounded by a housing 2, within which a solid electrolyte 3 is arranged. The housing is formed by two housing elements, which includes an inner housing element 2I and an outer housing element 2A. The outer housing element 2A is a metallic tube 2R which supports the lateral surfaces of the inner housing element 2I. The outer housing element 2A embraces two discs 2S which form the end faces of the storage cell 1 and also assume a support function. The inner housing element 2I is a cylinder of aluminum, the inside surfaces of which have corrosion protection. A cup-shaped inner housing element 2I is formed by welding an aluminum plate 2B to the lower edge region of the cylinder 2Z at the underside of this cylinder. The aluminum cylinder, at its upper end, has an inward-pointing flange 2F which extends up to the solid electrolyte 3. The solid electrolyte 3 is also in the shape of a cup. The dimensions of electrolyte 3 are chosen to form a coherent space between its outside surfaces and the inside surfaces of the housing element 2I which space serves as the cathode space 4. The cathode space 4 is filled with a graphite felt 4G which is impregnated with sulfur. An elastic felt 4F of graphite or carbon impregnated with sulfur is arranged between the lower end of the solid electrolyte, more particularly its dome, and the bottom of the housing element 2I. The interior of the solid electrolyte 3 serves as the anode space 5. As in the embodiment shown in FIG. 1, a safety container 6 completely filled with sodium, is arranged within the solid electrolyte 3. The safety container is completely closed except for an opening 8 in the lower region of the safety container. Similar to the embodiment example shown in FIG. 1, the dimensions of the safety container 6 are chosen to create a safety gap 7 between container 6 and the solid electrolyte 3. Gap 7 is filled with a material which acts as a capillary. The sodium contained in the safety container 6 can emerge into the safety gap 7 through the opening 8. The upper end of the solid electrolyte 3 is firmly connected to an insulating ring 3R. The insulating ring 3R is supported on the inward-pointing flange 2F of the inner housing element 2I and is connected to the latter by thermo compression. Thereby, the cathode space 4 is sealed vacuumtight from the outside. A washer 10 of aluminum is arranged on the top side of the insulating ring 3. The washer 10 is adjacent to the outer housing element 2A as well as the safety container 6 which extends beyond the solid electrolyte 3. The washer 10 is welded to the safety container 6 and is firmly connected to the insulating ring 3R by thermo compression. The washer 10 has in the vicinity of the safety container 6 a downward-pointing flange 10F which protrudes into the safety gap 7 and closes the latter. The storage cell is sealed at the top by the disc 2S belonging to the outer housing element 2A. The disc 2S is preferably made of the same material as the cylinder 2Z. A similar disc 2S is set against the bottom of the inner housing element 2I. The two discs 2S are held by the cylinder 2Z, the upper and lower end of which is beaded-over inward. The upper end of the safety container 6 is welded to an L-shaped anodic terminal 11, the second end of which is brought out insulated through a hole 12 in the disc 2S. In order to prevent electrical contact between the end of the anodic terminal 11 arranged in the storage cell and the disc 2S, an insulating washer 13 is provided which is made of a nonconductive elastic material and is supported by the safety container 6 and the washer 10.

In the embodiment example shown herein, the cathodic terminal 14 is arranged in the vicinity of the second end face of the storage cell. It is shaped like a plunger. The contact surface of the terminal element 14 is welded to the bottom plate 2B of the inner housing element 2. The shank of the terminal element 14 is pushed through a hole. To enable arrangement of the terminal element 14 between the disc 2S and the bottom plate 2B, the bottom plate 2B shaped to have a U-shaped cross section and is welded into the cylinder 2Z with the lateral edges of plate 2B pointing outward. As a result a gap is provided between the bottom plate 2B and the disc 2S, within which gap the plunger-like section of the terminal element 14 can be arranged.

Figure 4:
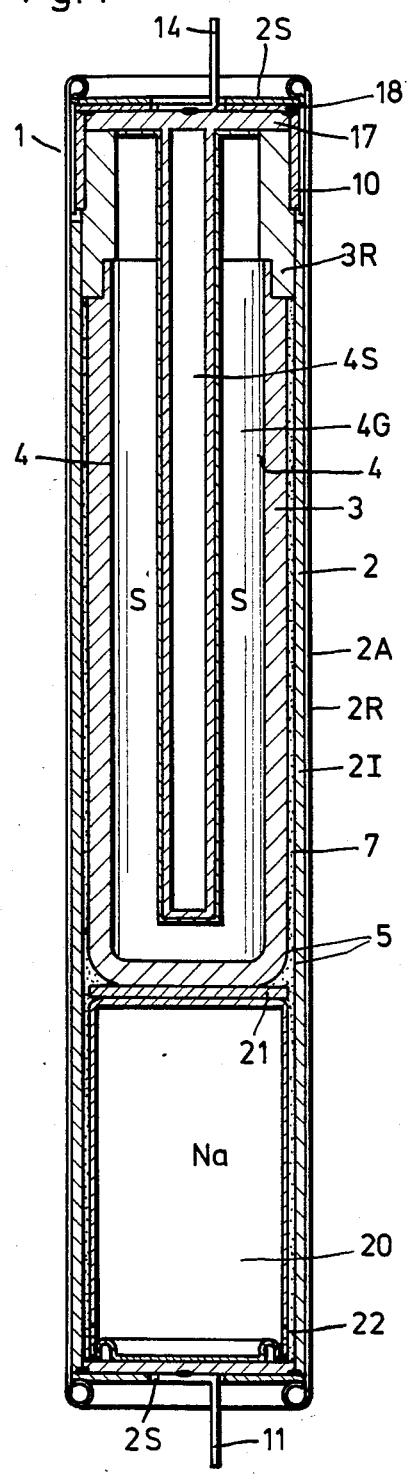
FIG. 4 is an inverted storage cell.

In FIG. 4 is shown an inverted storage cell 1 in which the housing 2 is formed by two housing clements 2A and 2I. The inner housing element 2I is cup-shaped and made of aluminum. Inner housing 2I is used as an anodic current collector. Its inside surfaces are provided with corrosion protection (not shown here). The outer housing element 2A can be made of a metal or an organic or inorganic material. It consists substantially of a tube 2R which surrounds the inner housing element 2I in the manner of an envelope and rests directly against its outside surface. The solid electrolyte 3 made here of beta aluminum oxide is arranged in the interior of the housing element 2I. A supply container 20 for the sodium is located in the inner housing element 2I. The supply container 20 is arranged in the lower portion of the storage cell 1, and the solid electrolyte 3 is located in the upper part of the cell 1. The length of the supply container 20 is about one-third of the total length of the storage cell 1. The solid electrolyte 3 is put on the supply container 20 with the interposition of a graphite felt 21. Between the outside surfaces of the solid electrolyte 3 and the inner surfaces of the inner housing element 2I is a coherent safety gap 7 which is filled with a material serving as a capillary. The supply container 20 has in its lower lateral region openings 22 all around, via which the sodium can leave the supply container 20 and get into the safety gap 7. In the embodiment example shown here, this safety gap 7 serves as the anode space 5. The supply container 20 is otherwise sealed on all sides. The cathode space 4 in the interior of the solid electrolyte 3 is filled with a graphite 4G impregnated with sulfur. In addition, a cathodic current collector in the form of a rod 4S is arranged within the cathode space. An insulating ring 3R, which overhangs outward is fastened at the upper end of the solid electrolyte 3, in the vicinity of its opening. The connection between the insulating ring 3R and the solid electrolyte 3 is preferably made via a glass solder. The lower region of the lateral boundary surface of the insulating ring 3R is connected to the inner housing element 2I via thermo compression. The lateral surfaces of the insulating ring are surrounded in the upper region by an aluminum enclosure 10 which is connected to the insulating ring 3R and the tube 2R by thermo compression. A plate 17 of aluminum which is firmly connected to the enclosure 10 is placed on the insulating ring 3R. An electric terminal element 14 is connected to the surface of the plate 17. The second end of element 14 is brought to the outside through holes (not shown here) which are arranged in a mica disc 18 and in the disc 2S. The mica disc 18 is disposed on the aluminum disc 17. The disc 2S which forms in part the outer housing element 2A and performs a support function is placed on disc 18. On the opposite end face, a disc 2S is likewise provided which is set against the bottom of the inner housing element 2I. The anodic terminal element 11 which is rigidly connected to the bottom of the inner housing element 2I, preferably by welding, goes through the disc 2S. The two discs 2S which belong to the outer housing element 2A, are made of the same material as the tube 2R. By beading-over the tube 2R at both its ends, the two discs 2S are held in the desired position.

The foregoing is a description corresponding, in substance, to German application No. P 33 40 264.7, dated Nov. 8, 1983, international priority of which is being claimed for the instant application, and which is hereby made part of this application. Any material discrepancies between the foregoing specification and the specification of the aforementioned corresponding German application are to be resolved in favor of the latter.

There are claimed:

1. Electrochemical storage cell based on alkali-metal and sulfur with at least one anode space and a cathode space which are separated from each other by an alkali-ion-conducting solid electrolyte and are bounded at least in some areas by a housing, the improvement comprising that the housing is subdivided into at least two housing elements of which one inner metallic housing element is provided for electrical conductance, is sealed vacuum-tight and is made of a highly conductive heat-resistant aluminum and an outer housing element made of a heat resistant material having a thickness between 0.3 and 0.5 cm for supporting the inner housing element, closely encloses the inner housing element and consists of a continuous tube open at both ends and two discs with one disc at each open end of the tube terminating the end faces of the cell in the housing, wherein by thermo-compression the inner housing element is directly connected to an insulating ring of the solid electrolyte and also the insulating ring is connected to the outer housing element via an aluminum enclosure and wherein a space between the inner housing element and the solid electrolyte is designed as a gap and serves as the anode space, a supply container for the alkali metal disposed in the lower portion of the inner housing element beneath the alkali-ion-conducting solid electrolyte, and lower lateral region openings in the supply container through which the alkali metal can leave the supply container and get into said gap, said supply container otherwise sealed on all sides.

2. Electrochemical storage cell according to claim 1, wherein the outer housing element is made of steel.

3. Electrochemical storage cell according to claim 1, wherein the outer housing element is made of unalloyed steel.

4. Electrochemical storage cell according to claim 1, wherein the outer housing element is made of titanium.

5. Electrochemical storage cell according to claim 1, wherein the outer housing element is made of a precipitation-hardened aluminum.

6. Electrochemical storage cell according to claim 1, wherein the outer housing element is made of a non-metallic material which is a fiber-reinforced organic material.

7. Electrochemical storage cell according to claim 1, wherein the outer housing element is made of a non-metallic material which is a fiber-reinforced inorganic material.

8. Electrochemical storage cell according to claim 1, wherein the inner housing element is supported from the interior by the material filled into the adjoining reagent space.

* * * * *